Nov. 6, 1928.  
D. E. GORDON ET AL  
1,690,973  
VEHICLE CONTROLLING MEANS  
Filed March 5, 1927  2 Sheets-Sheet 2
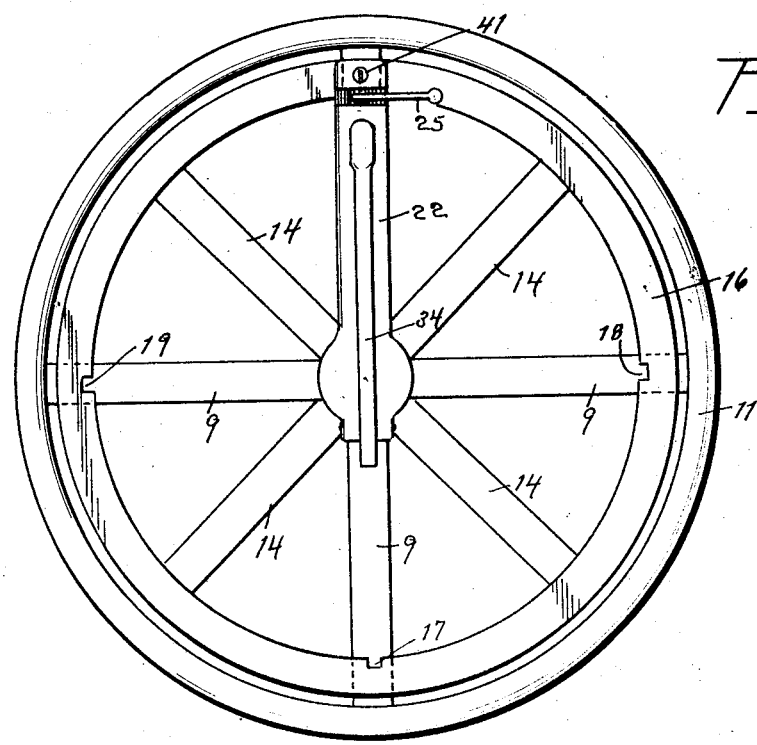
Fig. II.
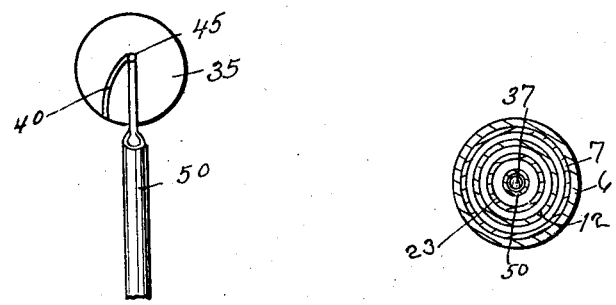 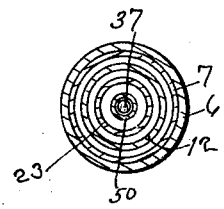
Fig. III.  Fig. IV.
INVENTORS  
G. S. FRAZER  
DOC E. GORDON  
BY Victor J. Evans  
ATTORNEYS.

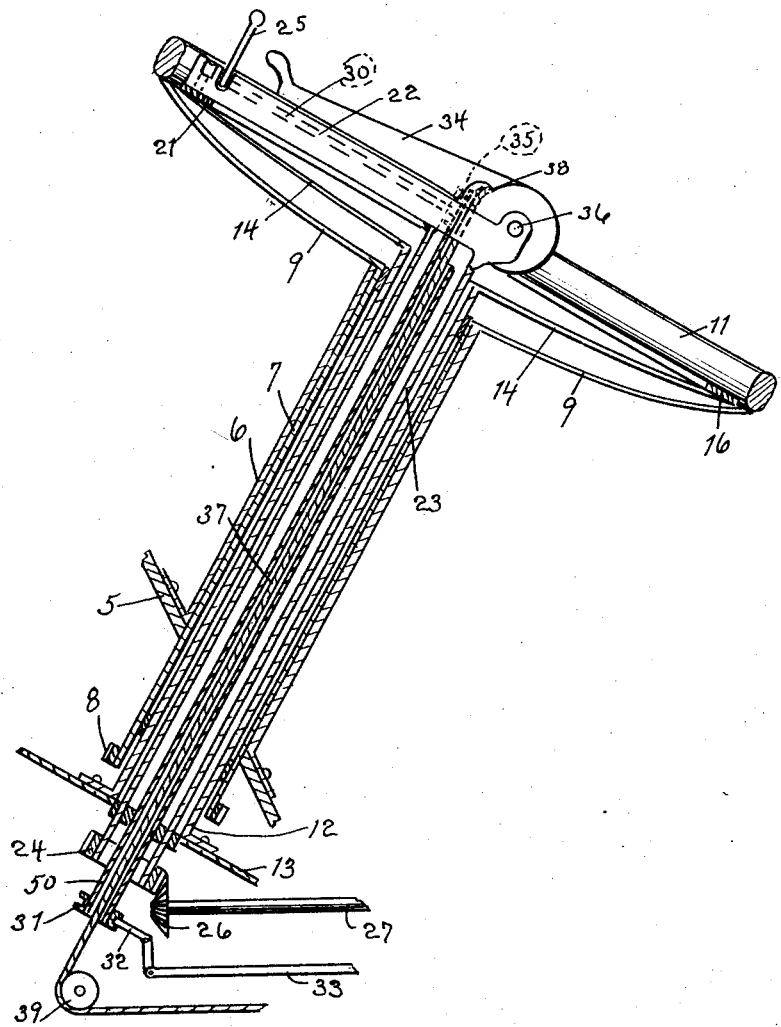

Patented Nov. 6, 1928.

1,690,973

UNITED STATES PATENT OFFICE.

DOC E. GORDON AND GILBERT S. FRAZER, OF OAKLAND, CALIFORNIA.

VEHICLE-CONTROLLING MEANS.

Application filed March 5, 1927. Serial No. 173,172.

This invention relates to improvements in vehicle controlling means, and has particular reference to means for selecting and shifting the gears of a motor vehicle.

The principal object of this invention is to place the gear selecting and shifting mechanism upon the steering wheel of the motor vehicle thereby obviating the necessity of the operator taking his hands away from the wheel.

Another object is to provide a device which is simple in construction, and therefore economical to manufacture.

A further object is to place the selection of the gears before the operator in such a manner that the operator will readily see which gear he is selecting.

A still further object is to provide means upon the steering wheel for operating the emergency brake.

Other objects and advantages will be apparent during the course of the following description.

In the accompanying drawings forming part of this specification, and wherein like numerals are employed to designate like parts throughout the same, Figure I is a vertical cross-section of a steering wheel constructed in accordance with our invention, Figure II is a top plan view of Figure I, Figure III is a fragmentary detail view of the gear shifting cam, and Figure IV is a cross-section of the steering column.

In the present method of selecting and changing gears in a motor vehicle, it is necessary for the operator to remove his hands from the steering wheel and to reach for the gear shifting lever which in congested places often results in accidents.

We have therefore devised means whereby the gears may be selected and shifted from a point upon the steering wheel. This mechanism is particularly adapted for use with the transmission described in my co-pending application, executed January 24th, 1927, and may be also applied to other forms of gear transmission.

In the accompanying drawings wherein for the purpose of illustration is shown a preferred embodiment of our invention, the numeral 5 designates the dash of an automobile having the steering column passing therethrough and enclosed in a casing 6 of the usual construction. The steering column is designated at 7, and carries at its lower end a gear 8 or any other suitable mechanism for actuating the wheels of the vehicle secured to the upper end of the steering column 7 or the spokes 9 of a steering wheel 11.

Concentrically positioned within the steering column 7 is a tubular support 12 which is secured to a brace 13 which brace is in turn connected to any convenient part of the vehicle. The upper extremity of this support carries spokes 14 which position a ring 16, which ring has a plurality of notches 17, 18, 19 and 21 formed therein. These notches serve to designate the various positions into which the selector 22 is moved. This selector consists of an arm having a tubular extension 23 concentrically positioned within the tubular support 12, and also carries a gear 24 upon its lower extremity which meshes with a gear 26 carried upon a shaft 27. This shaft 27 extends to the gear mechanism and upon proper rotation moves selector fingers or the like into the position to be engaged with the gear being selected.

The selector 22 has pivoted therein a gear engaging handle 25. This handle is connected to a rod 30 having a gear shifting disc 35 on the end thereof. This disc is provided in its face with a gear shift cam 40 within which a pin 45 is adapted to ride. This pin is attached to the upper cut-away extremity of a tubular member 50 concentrically positioned within the selector column.

Positioned on the lower extremity of this tubular member 50 is a collar 31 adapted to be engaged by one end of a rocker arm 32. The opposite end of which arm is pivoted to a bar 33 extending to the transmission.

Pivotally mounted in the selector is a brake handle 34 pivoted as at 36 and having one end of a cable 37 attached thereto as at 38. This cable passes through the tubular member 50 and over a pulley 39 and thence to the usual emergency brake equalizer.

The manner of using our device is as follows:—

Assuming that the same has been positioned upon a motor vehicle and the operator wishes to proceed, he may manipulate the lock 41 so as to release the control bar. By now moving this control bar over the ring 16 until it comes into position with the notch 18, he causes the selector column to rotate thus rotating the gear 26 and the shaft 27. This will move the proper gears which he wishes to select into alignment with each other.

By now moving the gear engaging handle 25 the disc 35 is rotated causing the cam 40 to move the tubular member 50 with the result that motion is transmitted through the rocker arm 32 to the bar 33 which will cause the engagement of the gears which have previously been selected. When it is desired to move to the next gear, the gear engaging handle is moved to a vertical position and the selector is moved to the next notch upon the ring, after which the gear engaging handle is again moved to horizontal position.

When it is desired to apply the brakes, the operator grasps the brake handle 34 raising the same vertically about its pivot 36 with the result that the cable 37 will be pulled thus causing the brakes to be applied to the wheels.

It will thus be seen that I have positioned upon the steering wheel all the necessary levers for operating a motor vehicle thereby relieving the operator of the necessity to move his hand and feet as is now customary.

It is to be understood that the form of our invention herewith shown and described is to be taken as a preferred example of the same and that various changes relative to the shape, size, material and arrangement of parts can be resorted to without departing from the spirit of the invention or the scope of the subjoined claim.

Having thus described our invention, we claim:—

In a transmission control means, the combination with a steering column having a steering wheel mounted thereon, a tubular support positioned within said steering column, said support having a ring mounted thereon, said ring being concentric with said steering wheel, a selector column concentrically positioned within said support and having a gear secured to its lower extremity, said gear being capable of transmitting rotary motion to a gear shift mechanism at a remote point, a selector bar supported in said steering column and adapted to move over said ring, said ring having notches formed therein for the purpose of designating fixed points for the movement of said selector bar, a gear engaging member pivotally supported in said selector bar and adapted to be rotated, a disc mounted in said selector bar, a cam surface formed in said disc, a tubular column concentrically positioned within said steering column, and adapted to be reciprocated through the action of said cam engaging a pin secured in said last mentioned column and means secured to the lower extremity of said last mentioned column for transmitting reciprocating motion to a remote point.

In testimony whereof we affix our signatures.

DOC E. GORDON.
GILBERT S. FRAZER.